INVENTORS
WALTER T. WHITE
EDMUND B. HAMMOND, JR.
GEORGE C. NEWTON, JR.
BY
Herbert H. Thompson
their ATTORNEY

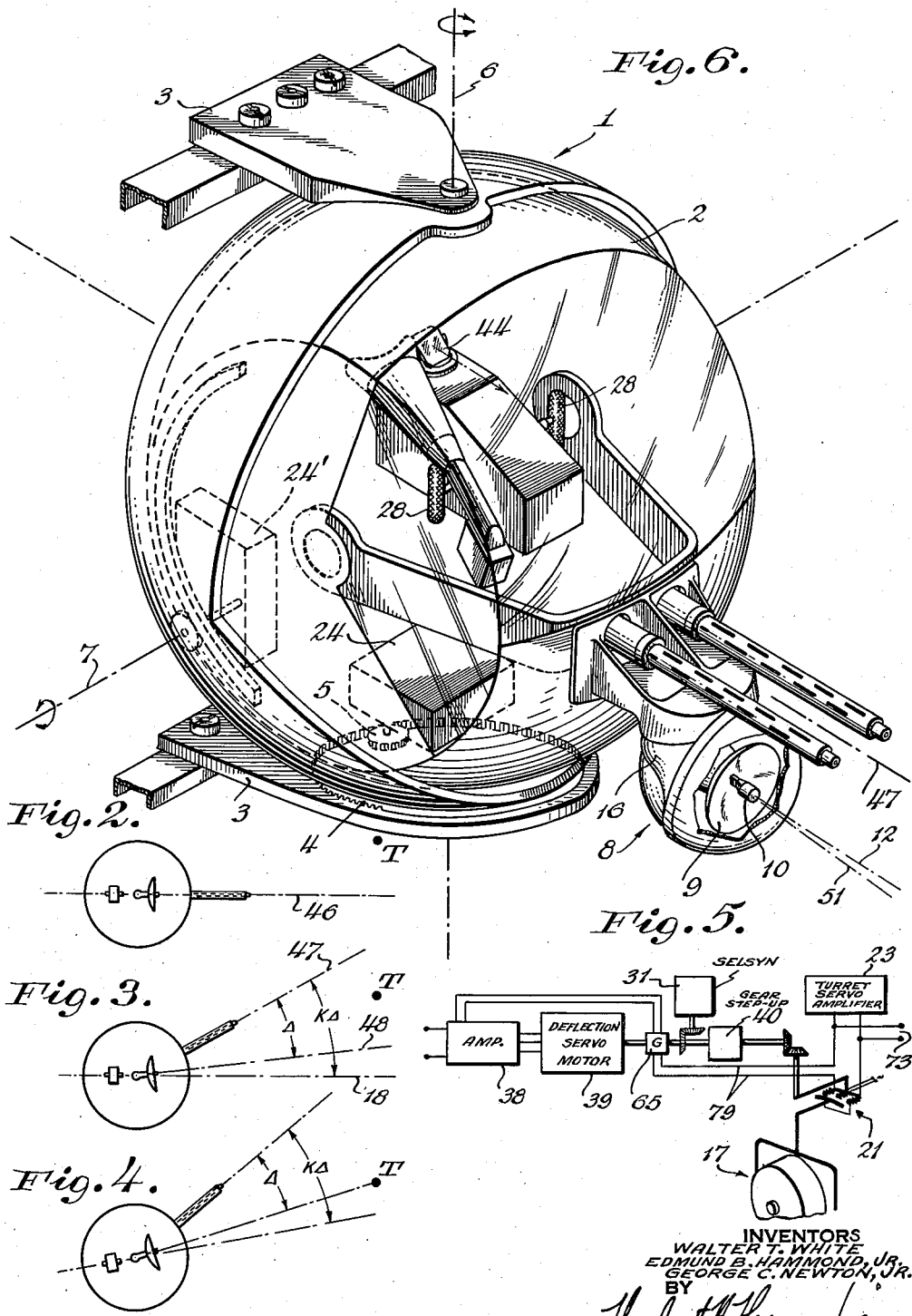

United States Patent Office 2,968,997
Patented Jan. 24, 1961

2,968,997

CROSS CONNECTED SERVO MECHANISM FOR A TURRET GUN DIRECTING SYSTEM

George C. Newton, Jr., Cambridge, Mass., and Walter T. White, New Hyde Park, and Edmund B. Hammond, Jr., Albertson, N.Y., assignors to Sperry Rand Corporation, a corporation of Delaware Filed May 9, 1947, Ser. No. 747,008

26 Claims. (Cl. 89—41)

The present invention relates broadly to a system comprising a plurality of servo loops or mechanisms in which the results produced by one of the servo loops is dependent upon the operation or the dynamic or static character of, or the result produced by, a second servo loop. In other words, this invention relates to a plurality of interdependent servo loops or mechanisms wherein the controls thereover are so correlated and arranged that one of the servo loops will operate as if another thereof were perfect in operation, that is, operated without error.

The present invention, more particularly, relates to a gun turret control system, preferably a stabilized turret, which is operated under the control of a radio sight to track a distant target. The broader aspects and objects of the present invention will best be understood from the following specification and the appended drawings which illustrate and describe a preferred and exemplary form of the present invention. In a stabilized gun turret system, it is our purpose so to interconnect the various servo loops employed therein that one or more thereof may function to produce a desired result as though one or more of the other servo loops were perfect in operation that is, for example, as if the other servo loops operated without lag or without error.

It is a primary object of the present invention so to interconnect two servo loops or mechanisms, where the operation of one is affected by the imperfections or dynamic or static errors in the other, that the one servo loop will operate as though the other servo loop were perfect.

Another object resides in providing a crossfeed of the control signal from one servo loop to a second servo loop and applying the control signal for the former servo loop, as a measure of the error therein in conjunction with the signal for the latter or second servo loop in controlling the latter servo loop.

Other objects reside in cross connecting the control signals of two servo loops in the manner above indicated wherein the crossfeed signal is applied either to buck or to aid the primary control signal in the second loop whereby in both cases to provide an operation of one servo loop in such a manner as to correct or compensate for errors in the other servo loop.

More particularly, it is an object of the present invention to provide a gun turret control system comprising a radio sight which is mounted on and carried by the turret for movements both in azimuth and in elevation, but is movable both in azimuth and elevation relative thereto, and wherein an error signal derived from the radio sight is the initial signal employed in controlling the turret servo motor and in driving the radio sight or scanner relative to the turret, and wherein means are provided for causing the servo loop driving the scanner to operate as though the turret servo mechanism or loop operated perfectly or without error.

Another object resides in providing a turret system or a gun turret control system of the foregoing character in which different signals are employed to control the turret servo motors and the scanner servo motors and the control signal for the turret servo motor is supplied in controlling relation to the scanner servo loop whereby to cause it to operate as though the turret servo loop were perfect.

Still other objects reside in providing a radio controlled, stabilized gun turret system which is characterized by the fact that the scanner servo loop, as pointed out above, operates as though the turret driving mechanisms functioned without lag.

Still another object resides in providing a gun turret control system of the above characters in which the turret servo loops are additionally controlled in accordance with the error signal in the scanner servo loop whereby still further to improve the overall stability and response of the system.

Another object resides in providing a manually and/or radio controlled gun turret wherein the manual controller is deflected or actuated in simulation of manual control while the turret is automatically controlled by the radio sight so that a manual control may be resumed or commenced smoothly and in complete conformance with the automatic operation when a change-over is effected.

The cross connection of the servo loops as proposed and herein described is for the purpose of improving the stability and the response characteristics of one or both of the interconnected servos, or, of the automatically controlled gun turret in whole or at least in part, to thereby improve the accuracy of the systems and diminish hunting.

The invention also relates to the novel features or principles of the instrumentalities described herein, whether or not such are used for the stated objects, or in the stated fields or combinations.

With the foregoing and still other objects in view, our invention includes the novel elements and the combinations and arrangements thereof described below and illustrated in the accompanying drawings, in which—

Fig. 1 is a diagrammatic representation of a radio and manually controlled, stabilized gun turret;

Figs. 2, 3 and 4 diagrammatically illustrate the relations of various of the component parts of the stabilized turret of Fig. 1 under assumed automatic tracking conditions;

Fig. 5 is a fragmentary illustration of a modification; and

Fig. 6 is a fragmentary perspective view of the turret of the present invention illustrating a preferred relative correlation of the parts of the system embodied therein.

Figure 1:
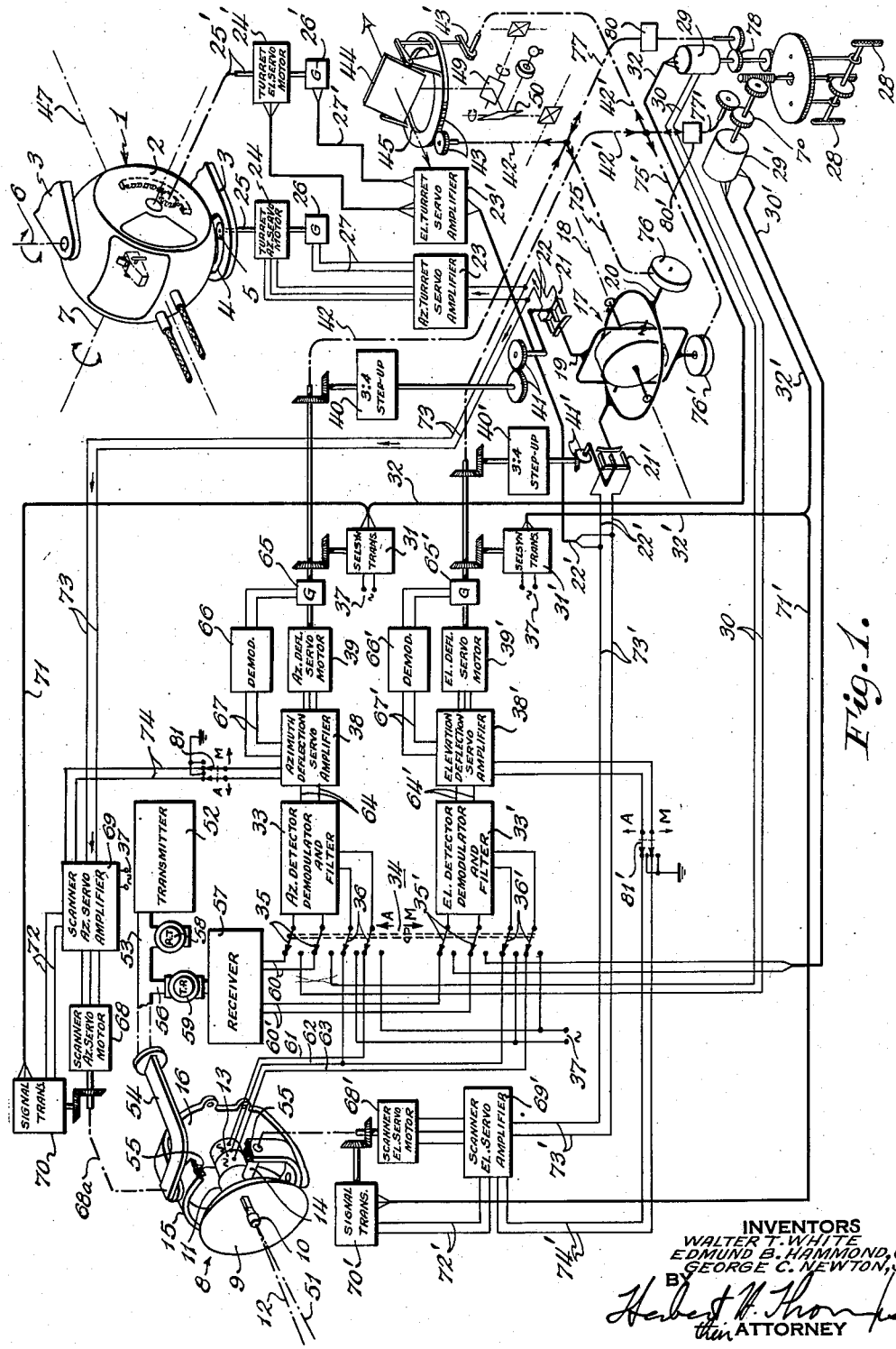

As heretofore indicated, the present invention both in its broad and more specific aspects will best be understood from a consideration of the exemplary embodiment thereof herein illustrated and described. Hence, it will be understood that our invention is not necessarily limited to a stabilized gun turret but that the various servo loops interconnected for control purposes in the manners hereinafter more specifically pointed out, may have other and widely different usages, but in all cases the result obtained will be substantially the same and that is that one servo loop, although dependent in its operation upon the operation of a second servo loop, will not reflect in its output those errors such as lag and the like which may appear in the second servo loop.

Referring to Fig. 1, we will first generally describe the component parts of our stabilized gun turret and radio sight and so much of the stabilizing and manual control apparatus which may be embodied in an optical sight as is deemed necessary to provide an indication of the main components of the entire system. The stabilized turret is represented generally at 1 and comprises an outer shell 2 which may be mounted on an airplane or the like and which is rotatably supported in any suitable manner upon a support 3, constituting, for example, a part of or fastened to the airplane fuselage. To the support is secured an internal gear 4, and a pinion 5 is mounted to mesh therewith for driving the turret in azimuth about the axis 6. Although we have illustrated various components of the present system in spaced relation for clearness, it will be understood that many of the parts, as hereinafter described, such as the scanner, the manually operable handlebars, optical sight including its associated computing mechanism (not illustrated or described), and the stabilizing gyro are all mounted on the turret for movement therewith both in azimuth and elevation. The inner shell of the turret is rotatably supported on the outer shell to pivot about the axis 7 in elevation. The scanner is mounted on the front of the turret, as illustrated in Fig. 6, while all the other components above-mentioned are mounted therewithin.

The scanner indicated generally at 8 is mounted on the inner shell of the turret, as shown in Fig. 6, and as more particularly shown in Fig. 1, comprises a parabolic reflector 9 and an antenna indicated generally at 10 which is protected by a suitable housing. The antenna may comprise a dipole which is loacted substantially at the focus of the paraboloid and is fed with radio energy through a suitable wave guide as hereinafter described. The scanner including the parabolic reflector, antenna, a spin motor 11 for spinning the antenna about the spin axis 12 and a two-phase reference voltage generator 13 are all mounted for movements in elevation and azimuth by means of a trunnion 14 on which the antenna assembly is supported and a gimbal ring 15 in which the trunnion 14 is rotatably mounted. The trunnion 14 supports the scanner for movements in elevation about a horizontal axis while the gimbal ring 15 is supported in any suitable manner to pivot about a vertical axis within a yoke 16. The yoke 16 is mounted on the front of the turret and to the inner shell thereof as shown in Fig. 6. Hence, the scanner may move both in elevation and azimuth with and relative to the turret which also may be driven both in elevation and azimuth to position the guns carried thereby toward a computed future position of a target being tracked. Suitable servo motors are associated with the scanner to rotate it in elevation relative to the gimbal ring and also with the gimbal ring in azimuth relative to the supporting yoke. The connections between the scanner elevation and azimuth servo motors are schematically shown in Fig. 1.

The stabilizing gyroscope which functions to stabilize the turret both in azimuth and elevation is, in the preferred embodiment of our invention, embodied in an optical sight so that a tracking operation of the turret may be performed either manually or under the control of the scanner, above-described, and the control systems associated therewith. Such a computing sight is illustrated in detail in copending application Ser. No. 748,815, filed on or about the 17th day of May 1947, now Patent No. 2,709,303, in the name of Edmund B. Hammond and assigned to the assignee of the present invention. The stabilizing gyro is indicated generally at 17 and may constitute a conventional free gyroscope, that is, a gyroscope having a spin axis free to precess both about an elevation and an azimuth axis. The spin axis of the gyroscope is indicated at 18 representing the axis of rotation of the gyro rotor. The gyro rotor casing is pivoted to move in elevation about trunnions supporting it in a vertical ring which in turn is mounted to rotate about the azimuth axis 19. The trunnions therefore define the elevation axis 20 of the gyro. An outer gimbal ring is journaled in the gyroscope casing to rotate about an axis coincident with the axis of the trunnions or about the elevation axis 20 and suitable connections are provided to effect movement thereof with the gyro rotor casing in elevation.

A pick-off 21 is associated with the gyro 17 about its azimuth axis or axis 19. Any suitable type of pick-off may be employed and an E type pick-off is shown merely as a preferred form thereof. Such a pick-off comprises two parts, one of which is an armature formed of magnetic material, and the other part of which comprises an E shaped core of magnetic material each of the three legs of which support a winding. The winding on the central leg is connected with a suitable source of alternating current and the windings on the outer legs are connected in series opposition and across output leads 22. One part of the pick-off, such as the armature is mounted to move with the vertical ring of the gyro, while the other part, such as the field or E-shaped core, is mounted on the outer case of the gyroscope so as to move with the turret in azimuth relative to the armature. When the armature is centralized relative to the core, magnetic fluxes pass from the central leg carrying the exciting winding, diverging through the armature and thence passing equally through the outer legs, and hence the voltages generated in the pick-up coils in the outer legs are equal in amplitude. Since these pick-up coils are connected in voltage opposing relationship, zero voltage output will result when the two parts of the pick-off occupy the above assumed positions. However, should the two parts of the pick-off become angularly shifted relative to each other so as to unbalance the voltages developed in the pick-off coils, one of said voltages will predominate thereby providing an output having a phase sense dependent upon the direction of relative movement of the pick-off parts and having an amplitude proportional to the angular displacement thereof. As hereinafter more fully described, the signal voltage output of the E pick-off is employed to control the azimuth turret servo motor so that the turret position in azimuth will be maintained in accordance with the azimuthal position of the spin axis of the gyroscope. Similarly, a pick-off such as an E transformer of the foregoing character is associated with the elevation axis of the gyroscope, as illustrated, for the purpose of controlling the elevation turret servo motor to maintain the turret position in elevation in accordance with the position in elevation of the spin axis of the gyroscope.

In Fig. 1, we have additionally shown a portion of the optics of an optical sight together with a manual controller mainly for the purpose of providing a reference to the optical line of sight when employed in connectiion with the manual control to aid in a clearer understanding of the operation of the present invention. It will be understood that in the complete stabilized turret installation, the sight will embody or operate in conjunction with a suitable computing mechanism for providing the correct total deflection or lead angle of the guns relative to the line of sight for target interruption purposes.

Furthermore, since the servo mechanisms or loops employed in automatically controlling the turret or in manually controlling the turret are substantially duplicated in the control thereof in elevation and azimuth, the following description will relate mainly to the azimuth driving servo loops.

Assuming that the gyroscope 17 is suitably driven so that its spin axis defines a directional reference axis in space, the armature of the E pick-off or transformer 21 will establish a directional reference relative to the core thereof so that if the azimuthal position of the turret, that is, the bore axes of the guns do not parallel or substantially coincide with the spin axis of the gyro, a signal voltage will be supplied across the leads 22 which are connected to the input of an azimuth servo amplifier 23, the output of which controls the direction and rate of operation of the turret azimuth servo motor 24. The turret azimuth servo amplifier 23 may be any suitable phase-sensitive amplifier which is energized from a suitable source of alternating current of the same frequency as that employed in energizing the E pick-off. The azimuth turret servo motor 24 is preferably a hydraulic servo motor such as that generally known as a "Vickers" drive. Such a servo comprises an A-end and a B-end, the A-end constituting a variable displacement pump which is driven by a constant speed motor and the B-end comprising a hydraulic motor. With this type of servo motor, the output of the servo amplifier 23 may be connected to actuate a torque motor which drives a hydraulic control valve which in turn controls a hydraulic stroke piston operably connected to the A-end of the servo motor for controlling the displacement of the pump. The details of such a servo motor have not herein been illustrated since they form no part of the present invention but any desired or suitable type of servo motor may be employed. However, it will be understood that the servo amplifier so controls the servo motor that its direction of operation is dependent upon the phase sense of the error signal input to the amplifier and that the output rate thereof is dependent upon the amplitude of the error signal. The output of the servo motor is represented by shaft 25 which is connected to drive the pinion gear 5 which upon rotation drives the turret in azimuth. As heretofore pointed out, the turret motor is preferably mounted within the turret but is shown exteriorly thereof for illustration purposes. A speed voltage generator 26 is driven by the output of servo motor 24 and provides a speed voltage which is proportional in magnitude to the output rate of the servo motor. This speed signal reverses in polarity or phase sense with reversals in the direction of rotation of the servo motor. The speed voltage is fed back in a degenerative fashion to the servo amplifier by means of leads 27 for damping purposes, that is to say, the speed voltage is normally applied in such sense as to oppose or buck the signal voltage supplied to the servo amplifier.

From the foregoing it should be understood that the gyro 17 through the medium of pick-off 21, the servo amplifier 23 and azimuth servo motor 24 functions to stabilize the turret in azimuth. The turret is also stabilized in elevation in a similar manner as will be apparent from a consideration of Fig. 1.

To produce continued rotation of the turret about its azimuth axis as in tracking a distant target, the gyro is caused to precess about its azimuth axis and in the proper direction thereby causing the turret to precede it or rotate at the same rate. Manually, this is accompanied by means of the handlebars 28 which are mounted for movement both in an azimuthal and elevation direction and the azimuthal movement of which are imparted to the rotor of a signal generator such as the selsyn 29. In the embodiment illustrated, selsyn 29 operates as a signal transformer to provide a voltage output across leads 30 when the rotor thereof is moved out of synchronism with a second selsyn unit 31 which is driven by the servo motor which applies an azimuthal precessing torque to the gyro, the fields of these selsyn units being connected together in multi-circuit fashion as shown through the cable 32. The signal voltage developed across leads 30 is supplied to the input of an amplifier 33. When the manually operable gang switch 34 is operated to connect the signal voltage from selsyn 29 to the input of amplifier 33, as through arms 35, the arms 36 are also operated to connect the amplifier 33 with a source of alternating current 37 which preferably is the same source employed in exciting the selsyn 31.

Amplifier 33 operates as a phase-sensitive amplifier to provide an output voltage having a polarity sense dependent upon the direction of rotation of handlebars 28 and of a magnitude proportional to the angular movement of the handlebars from a central or neutral position. The output of amplifier 33 is applied to the input of a servo amplifier 38 which may be of any suitable conventional design and the output of which controls a deflection servo motor 39. The output of servo motor 39 is connected to drive the rotor of selsyn 31 and also to drive the input of a gear step-up mechanism 40. Hence, the output of unit 40 is a displacement proportional to the displacement of the output of servo motor 39 in the ratio of, for example, 4 to 3, as hereinafter explained. The output of unit 40 is connected in any suitable manner as by the gearing 41 to operate the core of the azimuth E pick-off of the gyroscope 17.

Since the selsyns 29 and 31 have their fields connected together in multi-circuit fashion, the displacement output of servo motor 39 is proportional to handlebar displacement but the displacement of the core of E pick-off 21 preferably has some value greater than the handlebar displacement and may bear the ratio with respect thereto of 4 to 3 as above-indicated or any ratio greater than unity. In the broader aspects of this invention, any ratio may be provided, or unity ratio, and the ratio of 4 to 3 has herein been given mainly by way of example and in a specific sense because it is the arbitrary ratio actually employed by applicant in the preferred embodiment or stabilized gun turret of the present invention.

For explanatory purposes, we may assume that the gyroscope pick-offs are displaced in the ratio of 4 to 3 to the handlebar displacement. Additionally, the output of the azimuth deflection servo motor 39 drives into the optical sight as indicated schematically by the dot-dash lane 42 and through gearing 43 to rotate the lens or combining glass 44 through an angle in azimuth proportional to the angular displacement of the handlebars 28. Likewise, lens 44 is tilted in elevation by means of a similar drive from the elevation deflection servo motor and through a linkage 43'. Assuming for the moment, that the optical axis 45 of the lens 44 and the spin axis 18 of the gyroscope 17 are coincident and that the handlebars 28 are angularly displaced from a central or neutral position, the servo motor 39 will offset the core of pick-off 21 to cause the turret to rotate in the same direction as the handlebars are displaced and in a direction to zero the signal voltage output of the pick-off 21. This relationship may be understood from an examination of Figs. 2 and 3 and for an explanation of this operation we will initially assume that no precessing torque is applied to the gyroscope. As shown in Fig. 2, the three axes, turret or gun axis, gyro spin axis, and optical or radio sight axis, are coincident as represented by the dot-dash line 46. In Fig. 3, the turret has been driven forwardly through an angle ahead of the gyroscope spin axis proportional to $K\Delta$ or under the assumed conditions through an angle proportional to 4/3 the displacement angle of the handlebars 28 or $4/3\Delta$. However, the lens 44 is driven rearwardly or in the opposite direction from the axis of the guns through an angle equal to $\Delta$ or the displacement angle of the handlebars. The gun axis is represented by dot-dash line 47, the sight axis at 48, and the gyro spin axis at 18. The sight axis 48 may be either the optical sight axis 45 or the spin axis of the radio sight 8, since the optical sight axis and the radio sight axis will be maintained substantially parallel or coincident as will hereinafter appear. In Figs. 2, 3 and 4 we have indicated the sight axis as that of the radio sight rather than the optical sight.

Under the above-assumed conditions wherein we have assumed for the moment that the gyroscope is not precessed, it will be seen that the lag of the turret servo motor in driving the turret under the control of the output of pick-off 21 will be reflected in the operation of the sight. In other words, the line of sight as driven by the deflection servo motor moves rearwardly while the turret is driven forwardly toward the sighted target. If the line of sight is driven rearwardly in this manner at a greater rate than the turret is driven forwardly then the line of sight will at least momentarily move away from the target. Under automatic control by the radio line of sight or even under manual control, an operation of this character promotes instability. In accordance with the present invention, means are provided to prevent the lines of sight from experiencing a rearward movement away from the target, and the preferred embodiment of an arrangement for preventing such movement will best be understood in connection with the following description relating primarily to the operation of the stabilized turret in an automatic fashion under the control of the radio sight. However, in connection with the optical sight, it will be understood that means are provided such as the differential shown, having one input driven by the output of the step-up gearing 40 and the second input driven with the armature of the E pick-off and the output of the differential being connected to rotate mirror 50 whereby the mirror 50 is rotated in azimuth in accordance with the displacement between the parts of the E pick-off 21 or in accordance with a measure of the error in the turret azimuth servo loop in a direction to compensate the angular movement of the combining glass 44 or optical line of sight 45 relative to the axis of the guns after such error by shifting the reticle image. The mirror 50 projects the image of a reticle disposed between a lamp and said mirror on the combining glass 40. A similar arrangement is provided for driving the elevation mirror 49 from the elevation controls. As the error outputs of the respective E pick-offs, azimuth and elevation, are reduced toward zero, the mirrors 49 and 50 are, in proportion to the respective errors, returned toward their initial positions, and, hence, compensation for error or lag in the turret servo motor loops is effected. For a more complete disclosure of a suitable optics-compensating system, attention is directed to copending application Ser. No. 656,379, filed in the name of Edmund B. Hammond, Jr., inventor, and assigned to the assignee of the present invention.

The radio sight, hereinbefore briefly referred to, comprises a scanner 8 comprising a dipole antenna and parabolic reflector designed to provide both directive transmission and reception of radio waves. In practice, a directive receiving antenna may be used with a non-directive transmitting antenna or vice versa. The directivity axis of the antenna wave pattern is indicated at 51 and it will be observed that it is offset at a small angle, for example 2½ degrees, with respect to the spin axis 12 of the scanner. This may be either mechanically or electrically accomplished and the directive wave pattern is hence rotated in a conical manner in space about the directive or spin axis of the scanner which defines the radio line of sight. If the reflected waves reflect from a distant target, the reflected waves are picked up by the antenna to provide, as hereinafter described, a signal voltage substantially of sinusoidal form having the frequency of spin of the scanner and an amplitude proportional to the angular relationship between the spin axis of the scanner and the direction toward the target from which the waves are reflected. In other words, rotation or spinning of the scanner modulates the received wave to thereby provide, when phase-analyzed, a voltage representation of the relationship of the target to the scanner spin axis or radio line of sight.

A transmitter 52 is provided for supplying preferably voltage pulses which may recur at the rate of 2,000 per second. These pulses are transmitted over the wave guide sections 53, 54 and 55 and a further section which may be embodied in the journal 14 and thence applied to the dipole antenna 10. Received signals are likewise transmitted through the same wave guides and through wave guide 56 to a receiver 57. Suitable RT and TR boxes 58 and 59 may be inserted as shown to prevent transmitted waves from entering the receiver and likewise to prevent the received waves from entering the transmitter.

The receiver 57 may be of any suitable type to provide a sinusoidal voltage output proportional in amplitude to and of the same time phase and frequency as the received signal pulses as modulated by the spinning motion of the scanner. The output of the receiver is supplied across leads 60 to the azimuth detector 33. When operating under automatic control or with the radio sight, the gang switch 34 is actuated to connect the signal across leads 60 to the input of amplifier 33 which at the same time the arms 36 of switch 34 are actuated to connect a different reference voltage from that hereinabove described. For automatic control, the reference voltage is derived from a two-phase generator 13, the two voltage outputs of which are 90° out of phase and of a frequency corresponding to the spin frequency of the scanner. One of these reference voltages is connected across leads 61 and 62 and to the azimuth amplifier 33 while the other reference voltage is connected across leads 62 and 63 and to the corresponding elevation amplifier 33'.

Since these reference voltages are 90° out of phase, the respective amplifiers, which are energized thereby and to which the signal voltage outputs of receiver 57 are supplied, serve to resolve by phase comparison the signal voltages into azimuth and elevation components. In other words, the azimuth amplifier 33 functions to resolve the received signal derived from receiver 57 into the azimuth error component thereof by providing a signal voltage which is proportional to the component of the received signal which is in phase with the reference voltage supplied across leads 61 and 62. The amplifier 33 also operates as a demodulator and filter whereby to supply a uni-directional voltage across leads 64 in the output thereof which has a magnitude proportional to the azimuth component of the error angle between the directive axis of the scanner 8 or radio line of sight and the direction toward a distant target. The polarity sense of this signal voltage is dependent upon the direction of such angular error. The output of amplifier 33 is supplied to servo amplifier 38, hereinabove described, to produce an operation of deflection servo motor 39 in a similar manner to that described in the manual control of the turret under the operation of the handlebars 28.

For stabilizing purposes the servo motor 39 drives a generator 65 which supplies a voltage output proportional to the speed of the servo motor 39 and of a polarity or phase sense depending upon the direction of rotation thereof. The speed generator 65 may be either of an A.C. or D.C. type. In the event an A.C. type is employed as herein illustrated, the output thereof is preferably fed into a demodulator 66 which provides a reversible uni-directional voltage proportional in magnitude to the output speed of the servo motor and this voltage is fed back over leads 67 in a degenerative fashion to servo amplifier 38.

The radio line of sight or directional axis of the scanner 8 is driven relative to the turret 1 in substantially the same manner and for the same purposes as those hereinabove described in connection with the optical line of sight. For this purpose and for the additional reason that the scanner may be controlled to perform a searching operation, details of which are not herein illustrated since they form no part of the present invention, a servo loop is provided which functions normally to maintain the radio line of sight coincident with or parallel to the optical line of sight and which also functions to offset the line of sight relative to the axes of the guns for target tracking and interception purposes. The scanner servo loop comprises a servo motor 68 which is operatively connected as indicated by the dot dash line 68a to drive the gimbal ring 15 in azimuth about the vertical supporting axis therefore whereby to carry the scanner 8 therewith. The servo motor 68 is controlled by an amplifier 69 to drive the scanner in either direction and at a rate dependent upon the polarity or phase sense and the magnitude of the control signal input thereto.

One control signal is derived from a selsyn type signal transformer 70, the rotor of which is driven by the output of servo motor 68 and the stator of which is connected in multi-circuit fashion and through cable 71 with the field of selsyn 31, the rotor of which is driven by the output of servo motor 39. Ordinarily, the directivity axis of scanner 8 will be positioned by servo motor 68 in parallelism or coincidence with the optical line of sight 45 because the data system comprising selsyns 31 and 70 effects, through the scanner servo loop, a synchronous positioning of the radio line of sight with the optical sight. In other words, the angular position of the optical sight 45 is dependent upon the displacement of servo motor 39 and the signal output from the rotor of selsyn 70 is dependent upon the angular disagreement between the rotors of selsyns 31 and 70. Therefore, the signal output of selsyn 70 which is fed into amplifier 69 through leads 72 effects a driving of the scanner in the correct direction to reduce any angular disagreement as measured by the selsyns towards zero.

As hereinabove pointed out, the sighting apparatus embodied in the turret whether optical or radio is displaced rearwardly with respect to the direction of rotation of the turret when the deflection motor 39 is actuated ultimately to bring the sight to bear upon a distant target. In operating the optical sight the displacement of the optics is accomplished mechanically from the output of the servo motor. The radio line of sight will be displaced through a corresponding angular displacement through the operation of selsyn 31 in conjunction with selsyn or signal transformer 70. This operation is occasioned by the fact that the axes of the guns are displaced ahead of the spin axis of the gyro in a forward direction while the line of sight is simultaneously displaced rearwardly from the axes of the guns. However, because of the relatively high inertia of the turret and lag in the turret driving servo motor loop, the predetermined angular displacement thereof is not effected instantaneously or at such a high rate as to position the turret faster than the sight is offset therefrom in a rearwardly direction. Under such circumstances, the scanner would be moved in a direction to increase the error angle between its line of sight and the direction toward the target and such an operation would produce an unstable system. In accordance with the present invention, the turret driving servo loop and the scanner driving servo loop are so interconnected as to prevent any rearward movement of the radio line of sight away from the target. This result is preferably accomplished by connecting the signal voltage output of the E pick-off 21 to the input of the scanner servo amplifier 69 by means of leads 73. The E pick-off signal is supplied to amplifier 69 in any suitable manner and such that no signal from the selsyn 70 can be supplied to the azimuth turret servo amplifier. The E pick-off signal voltage represents the error between the actual displacement of the turret and the displacement called for by the output of the deflection servo motor 39. This error voltage is supplied to the scanner servo amplifier 69 in a sense opposing the signal derived from the selsyn signal transformer 70. Therefore, the scanner servo loop is compensated for error in the turret servo motor loop by a signal voltage which is proportional to such error so that if the error in the turret servo motor loop should reduce to zero, the compensation factor will reduce to zero and the radio line of sight will be deflected relative to the axis of the guns through an angle proportional to a deflection angle as measured by the angular error between the directivity axis of the scanner and the direction toward a distant target.

Furthermore, it will be recalled that in accordance with the preferred embodiment of this invention the displacement applied to the E pick-off as compared to the output displacement of the deflection servo motor 39 bears a ratio with respect to each other of at least unity and preferably a ratio of 4 to 3 as hereinbefore indicated in an exemplary sense. Under such conditions, the error signal appearing in the output of the pick-off 21 will be approximately a third greater than that supplied to the scanner servo amplifier from the selsyn transformer 70 where the signal voltage values are equal for equal measures of displacement errors. Hence, where the E pick-off voltage exceeds the selsyn voltage output, the radio line of sight will always move toward the target so that the system in its entirety will always operate to reduce the radio error signal towards zero. The degree of compensation will depend upon the relative values of the two signal voltages and their size orders may be correlated to provide the desired degree. Any amount of cross feed from one servo loop to the other will effect some degree of compensation.

In addition to the foregoing interconnection of the servo loops, the present invention also contemplates applying the error in the scanner servo loop, represented by the algebraic sum of the error voltage from signal transformer 70 and the E pick-off voltage on leads 73, to the input of servo amplifier 38, controlling the deflection servo 39, as by means of leads 74. The purpose of this connection is to compensate the deflection servo loop for errors in the scanner servo loop. For example, if the scanner servo loop were perfect and operated without error, it would maintain at zero the algebraic sum of the error voltage from signal transformer 70 and the error voltage from E pick-off 21. Since an actual scanner servo is not perfect, such lack of perfection is compensated for by the appropriate algebraic addition of the scanner servo-loop error-voltage, which is the algebraic sum of the error voltage from signal transformer 70 and the E pick-off voltage, appearing across leads 74, with the radar error-voltage derived from leads 64. Accordingly, by the foregoing compensations, the azimuth deflection servomechanism operates as though both the scanner servo and the turret servo were perfect, and errors of the scanner servo and turret servo caused by dynamic lags or static friction have no influence on the stability and smoothness of operation of the deflection servo. Leads 74 include a switch 81 therein, which is operable with gang switch 34 to supply this signal to the deflection servo amplifier when under control of the radio signal.

A brief description of the operation of the above-described stabilized gun turret will best be understood from the following, with reference to Figs. 1 through 4. Initially, it may be assumed that the directivity axis of the scanner 8, the axes of the guns and the spin axis of the gyro are all coincident or extend in parallel relation in space as shown in Fig. 2. Now assume that the scanner in conjunction with the receiver and azimuth detector or amplifier 33 provide a signal voltage proportional to the azimuthal error or angle between the axis 46 in Fig. 2 and the direction toward a target T. Accordingly, the deflection servo motor will displace the E pick-off 21 through an angle proportional to 4/3 the output displacement of the servo motor. The deflection servo motor will also apply a torque, through connecting linkages represented by the dot-dash lines 42 and 75 to a torque-exerting device 76, about the elevation axis of the gyroscope 17. This torque will be proportional to the output displacement of the deflection servo motor 39 and, hence, proportional to the error angle between the radio line of sight and the direction toward the target. For the moment, assuming that no torque is applied to the gyro, the relative angular displacement of the gun axis, radio line of sight axis, and the spin axis of the gyro shown in Fig. 3 will result. Since the E pick-off 21 is displaced through an angle proportional to $K\Delta$ where K is assumed for descriptive purposes to be 4/3, the turret will be displaced in a forward direction relative to the spin axis of the gyro through an angle proportional to $K\Delta$. At the same time, the rotor of selsyn 31 will be rotated relative to its stator in accordance with the displacement output of the deflection servo motor. Hence, the error voltage derived from the signal transformer 70 in the scanner servo loop will cause the scanner servo motor to drive the scanner in a rearward direction relative to the turret or the axes of the guns thereof and this angle is proportional to $\Delta$ or the output displacement of the deflection servo motor. Under the foregoing assumed conditions, the axis 47 of the guns will lead the axis of the radio sight 48 by the angle $\Delta$ and the axis of the radio sight will lead the spin axis 18 of the gyro by the angle $\Delta/3$.

The connection of the signal voltage output of the E transformer 21 to the scanner servo amplifier in a sense opposing the signal derived from the signal transformer 70 which would cause the radio sight axis 48 to move in a clockwise direction relative to the gun axis 47 as viewed in Fig. 3 prevents any movement of the axis of the line of sight 48 clockwise from the axis 46 shown in Fig. 2 but permits clockwise rotation thereof relative to the gun axis 47.

Additionally, as above indicated, the output of deflection servo motor 39 causes precession of the gyro spin axis in azimuth through the operation of the torquing device 76 and in a direction toward the target T. Fig. 4 represents generally the relationship of these various axes while tracking the target T. It will be seen that the radio line of sight is substantially on the target, since, because of the aforementioned turret-error compensation, there is an error only because of dynamic lag and static friction errors of the scanner servo loop. Actually, gyro precession is effected simultaneously with the above-described controls over the turret and the sight. Since the optical sight and the radio sight are substantially synchronized, the foregoing description of the operation of the turret under the control of the radio sight is substantially the same for the optical sight; in the latter case the control being effected mainly by the gunner who maintains the reticle of the optical sight on the target while manipulating the handlebars 28.

Further, in accordance with our invention, we have provided means for actuating the handlebars as the turret is controlled by the radio sight so that the displacement of the handlebars will simulate manual operating conditions. With this arrangement, if it is desired to change over from automatic to manual tracking, the gang switch 34 may be moved to its manual position and the handlebars will be in the correct position to enable the gunner to take over control with a smoothly effected transition. This result is accomplished because the handlebars will be in the correct position to maintain the pre-established rate of the turret and it will be unnecessary for the gunner to hunt for the correct handlebar position. The displacement of the handlebars in this fashion is preferably accomplished through the drive represented by the dot-dash line 42, hereinbefore described, which is connected to the output of the deflection servo motor 39 and also connects with a motion transmitting mechanism indicated generally by the dot-dash line 77. This latter mechanism preferably includes a lost-motion mechanism represented at 80 which may be coupled to drive the handlebars through the gearing represented generally at 78. Any suitable type of lost-motion mechanism such as scissor springs or washer piles and the like may be used which will permit unrestricted operation of the handlebars by an operator while causing a following operation of the handlebars when the turret is operating automatically under control of the radio signal. With this arrangement, the handlebars will be angularly displaced while the turret is automatically controlled by the scanner mechanism and through a deflection angle proportional to the output displacement of the deflection servo motor 39. Under manual control, the output displacement of the deflection servo motor is proportional to handlebar deflection and, hence, the handlebars will be positioned at all times in readiness for manual control while the turret is automatically controlled by the scanner. Of course, similar arrangements are provided for displacing the handlebars in elevation as in azimuth.

Since the foregoing control loops and mechanisms are substantially identical for the elevation control of the turret guns and sights, both radio and optical, it is believed that a detailed description thereof is unnecessary. For identification parts in the elevation controls have been designated by the same numbers as the corresponding parts in the azimuth controls but the numbers applied to the elevation components are primed. In connection with the elevation controls, it will be noted that the elevation amplifier 33', when connected with the scanner, is excited by the reference voltage appearing across leads 62 and 63 supplied from one phase of the spin frequency, phase reference voltage generator 13. The amplifier 33', to which the signal voltage output of receiver 57 is also supplied, functions to resolve the radio error signal into its elevation component by comparing the phase of the signal with respect to the reference phase derived from the spin frequency generator.

In Fig. 5, a modification of the present invention is schematically shown. In this figure, we have shown the azimuth deflection servo amplifier 38 connected in controlling relation to the deflection servo motor 39. As hereinabove described, the deflection servo motor functions to displace the core of the azimuth E pick-off 21 relative to its armature thereby causing a corresponding rotation of the turret relative to the gyro spin axis. In order to improve the response characteristic of the turret servo loop and to provide, in effect, an aided tracking operation thereof, we propose to connect the output of speed generator 65 in aiding relation to the output of the E pick-off 21 by means of leads 79 so that a voltage is fed to the turret servo amplifier 23 which is proportional to the sum of the output voltage of E pick-off 21 and speed generator 65. Since the output of speed generator 65 is proportional to the speed thereof or rate of change of displacement of the E pick-off and therefore only present during rotation of the deflection servo motor, it will provide an added input or velocity term to the turret servo motor loop which will be integrated by the servo motor loop and appear in the output thereof as a displacement term. In other words, during accelerations of the turret, the speed voltage from generator 65 will provide an increased rate of the turret drive. When the sight is tracking a target under constant speed conditions, no voltage will be derived from generator 65. Hence, the effect of the speed voltage will be to increase the rate of the turret servo during transient or varying speed conditions and the integration thereof which is effected by the servo loop produces an increased displacement in its output, proportional to such speed voltage, which is known as aided tracking. Of course, the output of speed generator 65 is also applied to amplifier 38 in degenerative fashion for damping purposes as hereinbefore described. The speed voltage is also preferably added into the scanner compensation loop, that is, by leads 73 to the scanner servo amplifier to improve the compensation operation. Under these conditions, the compensation term includes a displacement voltage and a speed voltage which are combined in an additive sense.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A system comprising a drivably supported object, a first servo mechanism including a control means therefor for driving said object, a second servo mechanism including a control means therefor for driving said object, means for supplying a signal proportional to the error between an output value of one of said servo mechanisms and the corresponding value called for by its control means, and means for additionally controlling the other servo mechanism by said signal.

2. A system comprising an object and a member both rotatably mounted and relatively angularly displaceable, a first servo mechanism including a control means therefor for rotating said object, a second servo mechanism including a control means therefor for rotating said member, means for supplying a signal proportional to the error between an output value of one of said servo mechanisms and the corresponding value called for by its control means, and means for additionally controlling the other servo mechanism by said signal.

3. A system comprising a drivably supported object, a first servo mechanism including a signal source for controlling the same, a second servo mechanism including a signal source for controlling the same, said mechanisms being connected independently to drive said object, means for supplying a signal proportional to the error between an output value of the first of said servo mechanisms and the corresponding value called for by the signal controlling the same, and means for combining said last mentioned signal with the signal controlling the second of said mechanisms.

4. A system of the character recited in claim 3 in which the signals controlling the second servo mechanism oppose each other.

5. A system of the character recited in claim 3 in which the signals controlling the second servo mechanism are algebraically added together.

6. A system comprising a drivably supported object, a first servo mechanism including a control means and a source of first signal therefor for driving said object, a second servo mechanism including a control means and a source of second signal therefor for driving said object, means for supplying a signal proportional to the error between an output value of said first servo mechanism and the corresponding value called for by its control means, means for additionally controlling the second servo mechanism by the latter signal, and means for controlling the first servo mechanism by the algebraic sum of the latter signal and said second signal.

7. The combination with a driven object and a source of first control signal, of a first servo loop including a first motor for driving said object and means for controlling said motor in accordance with said signal to drive said object in one direction, a source of second control signal, a second servo loop including a second motor and means for controlling said second motor in accordance with said second signal to drive said object in the opposite direction, and means for applying said second signal to the motor control means of said first servo loop.

8. The combination with a driven object and a source of first control signal, of a first servo loop including a first motor for driving said object and means for controlling said motor in accordance with said signal to drive said object in one direction, a source of second control signal, a second servo loop including a second motor and means for controlling said second motor in accordance with said second signal to drive said object in the opposite direction, and means for applying said second signal to the motor control means of said first servo loop in a sense opposing said first control signal to provide an operation of said first motor to drive said object as though the second servo loop operated without error.

9. The combination with a driven object and a source of first control signal, of a first servo loop including a first motor for driving said object and means for controlling said motor in accordance with said signal to drive said object in one direction, a source of second control signal, a second servo loop including a second motor and means for controlling said second motor in accordance with said second signal to drive said object in the opposite direction, and means for applying said second signal to the motor control means of said first servo loop in a sense algebraically additive to said first control signal to provide an operation of said first motor to drive said object as though the second servo loop operated without error.

10. The combination with a driven object and a source of initial control signal, of a first servo loop including a first motor for driving said object, means for deriving a first and second error signal proportional to said initial signal but the second being greater than the first, means for controlling said motor in accordance with said first signal to drive said object in one direction, a second servo loop including a second motor and means for controlling said second motor in accordance with said second signal to drive said object in the opposite direction, and means for applying said second signal to the motor control means of said first servo loop in a sense opposing said first signal to provide an operation of said first servo loop to drive said object as though the second servo loop operated without lag.

11. In a servo system of the character described, a driven object, a source of initial control signal, a first servo loop including a first motor for driving said object, means for deriving a first and second error signal proportional to said initial control signal but the second being greater than the first, means for controlling said first motor in accordance with said first signal to drive said object through an angular displacement in one direction proportional to said first signal, a second servo loop including a second motor and means for controlling said second motor in accordance with said second signal to drive said object through an angular displacement in the opposite direction proportional to said second signal, and means for applying said second signal to the motor control means of said first servo loop in a sense opposing said first signal whereby to provide an operation of said first servo loop to drive said object as though the said second loop operated without error.

12. In a servo system of the character described, a drivable object, a source of initial control signal, a first servo loop including a first motor for driving said object, a pair of signal generators, means controlled by the initial signal for operating said generators to provide first and second error signals, the second error signal being greater than the first, means for controlling said first motor in accordance with said first error signal to drive said object in one direction, a second servo loop including a second motor and means for controlling said second motor in accordance with said second error signal to drive said object in the opposite direction, means for applying said second error signal to the motor control means of said first servo loop in a sense opposing said first error signal whereby to provide an operation of said first servo loop to drive said object as though the second servo loop operated without error.

13. In a servo motor system of the character described, a drivable object, a source of initial control signal, a first servo loop including a first motor for driving said object, a second servo loop including a second motor for driving said object, a pair of signal generators for providing a first and second error signal, a servo motor for operating said signal generators, an amplifier responsive to said initial control signal for controlling said servo motor, a driving connection between said servo motor and said pair of generators, the second generator providing a greater signal output as compared to the first thereof, means for controlling said first motor in accordance with the first error signal, means for controlling the second motor in accordance with the second error signal, and means for applying said second error signal to the motor control means of said first motor in a sense opposing the first error signal.

14. In a system of the character described, a rotatable support, an object rotatably mounted on said support, said object and support being rotatable about parallel axes, a source of initial control signal, a first servo loop including a first motor for driving said object, a second servo loop including a second motor for driving said support, means for deriving a first and second error signal proportional to said initial signal but the second being greater than the first, means for controlling said first motor in accordance with said first error signal to drive said object in one direction, means for controlling said second motor in accordance with said second error signal to drive said support in the opposite direction, and means for applying said second error signal to the motor control means of said first servo loop in a sense opposing said first signal.

15. In a turret gun directing system, a turret supported for movement about an axis, a turret servo motor for driving said turret about said axis, a scanner defining a radio line of sight and mounted on said turret to move relative thereto about an axis paralleling said turret axis, a scanner servo motor for driving said scanner about said axis, means for producing a signal voltage in accordance with the error angle between said radio line of sight and the direction from said scanner toward a distant target, means responsive to said signal voltage for controlling said turret motor to drive said turret forwardly in a direction to reduce said error angle, means responsive to said signal voltage for controlling said scanner motor to drive said scanner backwardly relative to said turret, and means for preventing backward movement of the radio line of sight relative to and away from the target.

16. In a turret gun directing system, a turret supported for movement about an axis, a turret servo motor for driving said turret about said axis, a scanner defining a radio line of sight and mounted on said turret to move relative thereto about an axis paralleling said turret axis, a scanner servo motor for driving said scanner about said axis, means for producing a signal voltage in accordance with the error angle between said radio line of sight and the direction from said scanner toward a distant target, means responsive to said signal voltage for controlling said turret motor to drive said turret forwardly in a direction to reduce said error angle, means responsive to said signal voltage for controlling said scanner motor to drive said scanner backwardly relative to said turret, and means for additionally controlling said scanner motor to prevent backward movement of the radio line of sight relative to and away from the target.

17. In a turret gun directing system, a turret supported for movement about an axis, a turret servo motor for driving said turret about said axis, a scanner defining a radio line of sight and mounted on said turret to move relative thereto about an axis paralleling said turret axis, a scanner motor for driving said scanner about its axis, means for producing a signal voltage in accordance with the error angle between said radio line of sight and the direction from said scanner toward a distant target, means responsive to said signal voltage for providing a first displacement signal proportional to an error greater than said error angle, and means responsive to said first displacement signal for controlling said turret motor to drive said turret forwardly in a direction to reduce said error angle, means responsive to said signal voltage for providing a second displacement signal proportional to the error angle, means responsive to said second displacement signal for controlling said scanner motor to drive said scanner backwardly relative to said turret, and means for additionally controlling said scanner motor with said second displacement signal to prevent backward movement of the radio line of sight relative to and away from the target.

18. In a turret gun directing system, a turret supported for movement about an axis, a turret servo motor for driving said turret about said axis, a scanner defining a radio line of sight and mounted on said turret to move relative thereto about an axis paralleling said turret axis, a scanner motor for driving said scanner about its axis, means for producing a signal voltage proportional to the error angle between the radio line of sight and the direction from said scanner toward a distant target, means including motor means controlled by said signal voltage for providing a first signal proportional to said error angle and a second signal proportional to a larger error angle, means responsive to said second signal for controlling said turret servo motor to drive said turret forwardly in a direction to reduce said error angle, means responsive to said first signal for controlling said scanner motor to drive said scanner backwardly relative to said turret, and means for applying said second signal to the control means for the scanner servo motor in a sense opposing said first signal.

19. In a turret gun directing system, a turret supported for movement about an axis, a turret servo motor for driving said turret about said axis, a scanner defining a radio line of sight and mounted on said turret to move relative thereto about an axis paralleling said turret axis, a scanner motor for driving said scanner about its axis, means for producing a signal voltage proportional to the error angle between said radio line of sight and the direction from said scanner toward a distant target, a servo mechanism controlled by said signal voltage for providing a displacement in its output proportional to said error angle, a first signal generator driven by said servo mechanism for supplying a first signal, a second signal generator driven by said servo mechanism for supplying a second signal smaller in magnitude than said first signal, means for controlling said turret servo motor by said first signal to drive said turret forwardly in a direction to reduce said error angle, means for controlling said scanner servo motor by said second signal to drive said scanner backwardly relative to said turret, and means for additionally controlling said scanner servo motor by said first signal to prevent backward movement of the radio line of sight relative to and away from the target.

20. A stabilized gun directing system comprising a turret supported for movement about an axis, a turret servo motor for driving said turret about said axis, a free gyroscope mounted on said turret and supported to move about an axis paralleling said turret axis, a displaceable pick-off associated with said gyroscope about its said axis, amplifier means responsive to the signal output of said pick-off for controlling said motor to drive said turret in a direction to zero said signal, a scanner defining a radio line of sight and mounted on said turret to pivot relative thereto about an axis paralleling said turret axis, a scanner servo motor for driving said scanner about its axis, means for producing a signal voltage in accordance with the error angle between said radio line of sight and the direction from said scanner toward a distant target, means controlled by said signal voltage for displacing said pick-off in a direction causing said turret to rotate in a forward direction to reduce said signal voltage, means for controlling said scanner servo motor to drive said scanner backwardly relative to said turret in accordance with said signal voltage, and means for preventing backward movement of the radio line of sight relative to and away from the target.

21. A stabilized gun directing system comprising a turret supported for movement about an axis, a turret servo motor for driving said turret about said axis, a free gyroscope mounted on said turret and supported to move about an axis paralleling said turret axis, a displaceable pick-off associated with said gyroscope about its said axis, amplifier means responsive to the signal output of said pick-off for controlling said motor to drive said turret in a direction to zero said signal, a scanner defining a radio line of sight and mounted on said turret to pivot relative thereto about an axis paralleling said turret axis, a scanner servo motor for driving said scanner about its axis, means for producing a signal voltage in accordance with the error angle between said radio line of sight and the direction from said scanner toward a distant target, means controlled by said signal voltage for displacing said pick-off in a direction causing said turret to rotate in a forward direction to reduce said signal voltage, means for controlling said scanner servo motor to drive said scanner backwardly relative to said turret in accordance with said signal voltage, and means for preventing said scanner motor from effecting a backward movement of the radio line of sight relative to and away from the target.

22. A stabilized gun directing system comprising a turret supported for movement about an axis, a turret servo motor for driving said turret about said axis, a free gyroscope mounted on said turret and supported to move about an axis paralleling said turret axis, a displaceable pick-off associated with said gyroscope about its said axis, amplifier means responsive to the signal output of said pick-off for controlling said motor to drive said turret in a direction to zero said signal, a scanner defining a radio line of sight and mounted on said turret to pivot relative thereto about an axis paralleling said turret axis, a scanner servo motor for driving said scanner about its axis, means for producing a signal voltage in accordance with the error angle between said radio line of sight and the direction from said scanner toward a distant target, servo mechanism for displacing said pick-off in an amount proportional to said signal voltage and in a direction causing said turret to rotate in a forward direction to reduce said signal voltage, signal generating means driven by said servo mechanism for controlling said scanner servo motor to drive said scanner backwardly relative to said turret through an angular displacement no greater than that called for by the displaced pick-off, and means for preventing said scanner motor from effecting a backward movement of the radio line of sight relative to and away from the target.

23. A stabilized gun directing system comprising a turret supported for movement about an axis, a turret servo motor for driving said turret about said axis, a free gyroscope mounted on said turret and supported to move about an axis paralleling said turret axis, a displaceable pick-off associated with said gyroscope about its said axis, amplifier means responsive to the signal output of said pick-off for controlling said motor to drive said turret in a direction to zero said signal, a scanner defining a radio line of sight and mounted on said turret to pivot relative thereto about an axis paralleling said turret axis, a scanner servo motor for driving said scanner about its axis, means for producing a signal voltage in accordance with the error angle between said radio line of sight and the direction from said scanner toward a distant target, a servo mechanism for displacing said pick-off in an amount proportional to said signal voltage and in a direction causing said turret to rotate in a forward direction to reduce said signal voltage, signal generating means driven by said servo mechanism for controlling said scanner servo motor to drive said scanner backwardly relative to said turret through an angular displacement smaller than that called for by the displaced pick-off, and means for supplying the signal from said pick-off in controlling relation to said scanner servo motor but in a manner opposing the signal derived from said signal-generating means.

24. A stabilized gun directing system comprising a turret supported for movement about an axis, a turret servo motor for driving said turret about said axis, a free gyroscope mounted on said turret and supported to move about an axis paralleling said turret axis, a displaceable pick-off associated with said gyroscope about its said axis, amplifier means responsive to the signal output of said pick-off for controlling said motor to drive said turret in a direction to zero said signal, a scanner defining a radio line of sight and mounted on said turret to pivot relative thereto about an axis paralleling said turret axis, a scanner servo motor for driving said scanner about its axis, means for producing a signal voltage in accordance with the error angle between said radio line of sight and the direction from said scanner toward a distant target, means controlled by said signal voltage for displacing said pick-off in a direction causing said turret to rotate in a forward direction to reduce said signal voltage, means for controlling said scanner servo motor to drive said scanner backwardly relative to said turret in accordance with said signal voltage, and means for preventing backward movement of the radio line of sight relative to and away from the target, and means controlled by said signal voltage for causing said gyro to precess in the direction said turret is driven.

25. A stabilized gun directing system comprising a turret supported for movement about an axis, a turret servo motor for driving said turret about said axis, a free gyroscope mounted on said turret and supported to move about an axis paralleling said turret axis, a displaceable pick-off associated with said gyroscope about its said axis, amplifier means responsive to the signal output of said pick-off for controlling said motor to drive said turret in a direction to zero said signal, a scanner defining a radio line of sight and mounted on said turret to pivot relative thereto about an axis paralleling said turret axis, a scanner servo motor for driving said scanner about its axis, means for producing a signal voltage in accordance with the error angle between said radio line of sight and the direction from said scanner toward a distant target, a servo mechanism for displacing said pick-off in an amount proportional to said signal voltage and in a direction causing said turret to rotate in a forward direction to reduce said signal voltage, signal generating means driven by said servo mechanism for controlling said scanner servo motor to drive said scanner backwardly relative to said turret through an angular displacement no greater than that called for by the displaced pick-off, means for preventing said scanner motor from effecting a backward movement of the radio line of sight relative to and away from the target, and means actuated by said servo mechanism for applying a torque on said gyro causing it to precess in the direction said turret is driven.

26. A stabilized gun directing system comprising a turret supported for movement about an axis, a turret servo motor for driving said turret about said axis, a free gyroscope mounted on said turret and supported to move about an axis paralleling said turret axis, a displaceable pick-off associated with said gyroscope about its said axis, amplifier means responsive to the signal output of said pick-off for controlling said motor to drive said turret in a direction to zero said signal, a scanner defining a radio line of sight and mounted on said turret to pivot relative thereto about an axis paralleling said turret axis, means for producing a signal voltage in accordance with the error angle between said radio line of sight and the direction from said scanner toward a distant target, servo mechanism for displacing said pick-off in an amount proportional to said signal voltage and in a direction causing said turret to rotate in a forward direction to reduce said signal voltage, manually operable turret control means and signal generating means operated thereby for controlling said pick-off-displacing servo mechanism and means driven by the output of said pick-off-displacing servo mechanism for displacing said manually operable means in simulation of manual control.

References Cited in the file of this patent

UNITED STATES PATENTS

| 2,405,065 | Tear | July 30, 1946 |
| 2,416,562 | Alexanderson | Feb. 25, 1947 |
| 2,417,248 | Godet | Mar. 11, 1947 |
| 2,433,843 | Hammond et al. | Jan. 6, 1948 |